(12) United States Patent
Bergo

(10) Patent No.: US 12,428,968 B2
(45) Date of Patent: Sep. 30, 2025

(54) FILLING AN AIRCRAFT TURBINE ENGINE LUBRICANT TANK

(71) Applicant: SAFRAN AIRCRAFT ENGINES, Paris (FR)

(72) Inventor: Claire Alexia Bergo, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 130 days.

(21) Appl. No.: 17/904,312

(22) PCT Filed: Feb. 15, 2021

(86) PCT No.: PCT/FR2021/050264
§ 371 (c)(1),
(2) Date: Aug. 16, 2022

(87) PCT Pub. No.: WO2021/165606
PCT Pub. Date: Aug. 26, 2021

(65) Prior Publication Data
US 2023/0058042 A1 Feb. 23, 2023

(30) Foreign Application Priority Data
Feb. 21, 2020 (FR) ........................ 2001751

(51) Int. Cl.
*F01D 9/06* (2006.01)
*F01D 25/18* (2006.01)
(Continued)

(52) U.S. Cl.
CPC ............. *F01D 9/065* (2013.01); *F01D 25/18* (2013.01); *F01M 11/0458* (2013.01); *F02C 7/06* (2013.01);
(Continued)

(58) Field of Classification Search
CPC ..... F01D 9/065; F01D 25/18; F01M 11/0458; F02C 7/06; F05D 2230/72; F05D 2260/98; F16N 2037/006
See application file for complete search history.

(56) References Cited

U.S. PATENT DOCUMENTS 2,861,421 A * 11/1958 Hockert .................. F01D 25/18
60/39.08
11,035,294 B2 * 6/2021 Eichstadt .................. F02C 7/32
(Continued)

FOREIGN PATENT DOCUMENTS

EP 3564497 A1 * 11/2019 ............. F01D 25/20
FR 3 072 425 A1 4/2019
(Continued)

OTHER PUBLICATIONS

English translation of Written Opinion mailed Jun. 2, 2021, issued in corresponding International Application No. PCT/FR2021/050264, filed Feb. 15, 2021, 5 pages.
(Continued)

*Primary Examiner* — Courtney D Heinle
*Assistant Examiner* — Jesse M Prager
(74) *Attorney, Agent, or Firm* — CHRISTENSEN O'CONNOR JOHNSON KINDNESS PLLC

(57) ABSTRACT

A dual flow turbine engine includes at least one lubricant tank located in an annular space of the turbine engine body and at least one hatch which is provided on an external cowling of a nacelle, for filling the tank. The tank is configured to be filled, by means of a removable tubular pipe inserted from the hatch into the tank, through canisters. One of the canisters includes a first interface through which the pipe is configured to pass, and another canister includes a second interface for connecting the pipe to the tank.

11 Claims, 7 Drawing Sheets

(51) Int. Cl.
 *F01M 11/04* (2006.01)
 *F02C 7/06* (2006.01)
(52) U.S. Cl.
 CPC ...... *F05D 2230/72* (2013.01); *F05D 2260/98* (2013.01)

(56) References Cited

U.S. PATENT DOCUMENTS

| | | | |
|---|---|---|---|
| 2008/0073154 A1* | 3/2008 | Eleftheriou | F01D 25/18 184/105.1 |
| 2018/0224043 A1* | 8/2018 | Hendrickson | F01D 25/162 |
| 2019/0101234 A1* | 4/2019 | Quang | F16L 37/23 |

FOREIGN PATENT DOCUMENTS

| | | |
|---|---|---|
| FR | 3 079 873 A1 | 10/2019 |
| FR | 3 082 552 A1 | 12/2019 |

OTHER PUBLICATIONS

International Preliminary Report on Patentability mailed Aug. 23, 2022, issued in corresponding International Application No. PCT/FR2021/050264, filed Feb. 15, 2021, 6 pages.
International Search Report mailed Jun. 2, 2021, issued in corresponding International Application No. PCT/FR2021/050264, filed Feb. 15, 2021, 6 pages.
Written Opinion mailed Jun. 2, 2021, issued in corresponding International Application No. PCT/FR2021/050264, filed Feb. 15, 2021, 5 pages.

\* cited by examiner

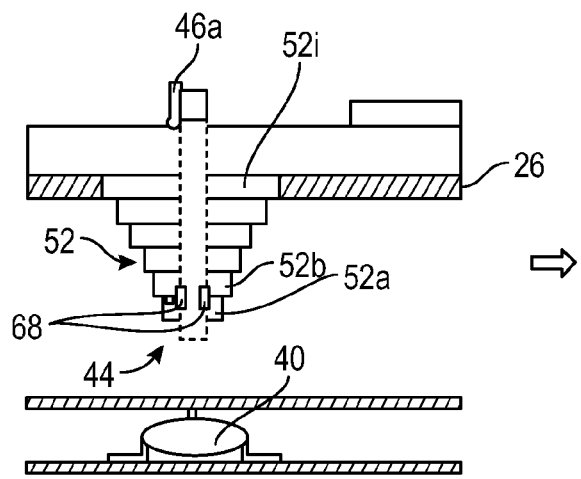
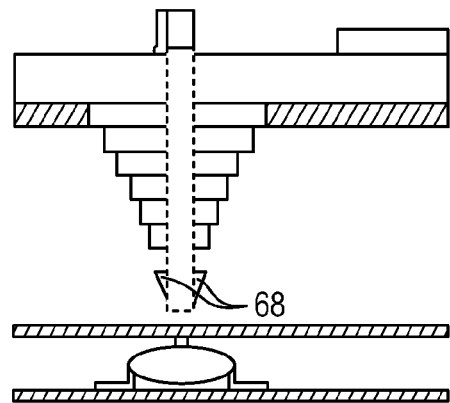
FIG. 12  FIG. 13
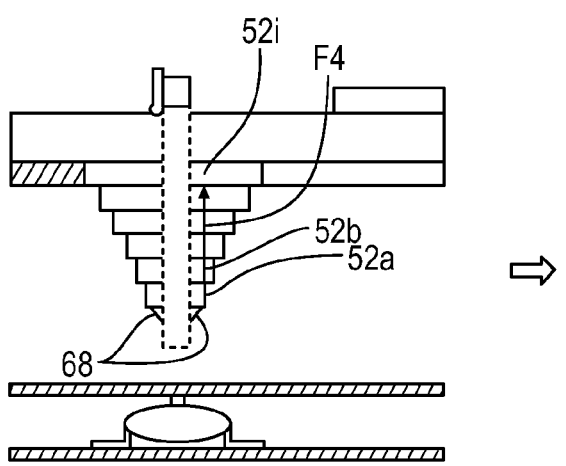
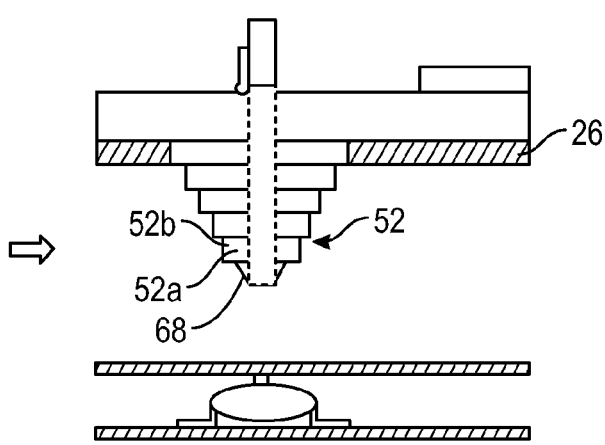
FIG. 14  FIG. 15

FILLING AN AIRCRAFT TURBINE ENGINE LUBRICANT TANK

FIELD OF THE DISCLOSURE

The present disclosure relates in particular to an aircraft turbine engine comprising a lubricant tank as well as a method for filling this tank with lubricant.

BACKGROUND

In a classical way, a double-flow turbine engine comprises a gas generator surrounded by a nacelle. A fan is located upstream of the gas generator and generates a gas flow that separates into a primary flow that flows inside the gas generator (through compression stages, a combustion chamber, and turbine stages), and a secondary flow that flows between the gas generator and the nacelle.

A turbine engine is equipped with at least one lubricant tank for supplying lubricant, in particular oil, in particular to the bearings of the turbine engine.

The lubricant tank is usually installed in a compartment of the nacelle, i.e. a compartment delimited externally by an outer cowling of the nacelle. This compartment of the nacelle is delimited internally by an outer engine casing, formed for example by the assembly of a fan casing (referred to as carter fan) with an outer intermediate casing shroud, also referred to as VCI, which casing surrounds the gas generator and delimits externally the duct for the flow of the secondary flow. The generally annular space between the outer cowling of the nacelle and the engine casing formed by the VCI with the fan casing is referred to as the fan compartment and allows for the storage of several items of equipment of the turbine enginery such as the aforementioned relatively large tank. The positioning of the tank in this space facilitates the access to the tank since it is sufficient to provide a direct access hatch on the cowling or to dismount a portion of the cowling, in order to have access to the tank, for example for a maintenance operation such as filling the tank.

In the architectures of the future, the search for a reduction in fuel consumption by the engines is pushing towards an increase in the bypass ratio of the engines. This is the case with the preliminary design of the engine referred to as UHBR (Ultra High By-pass Ratio), whose fan diameter is much larger than that of a conventional engine. The increase of the fan diameter induces an increase of the dimensions of the nacelle and thus of the aerodynamic losses induced by this one (increased frontal surface and wetted surface). The refinement of the lines of the nacelle is therefore particularly important for this type of engine architecture. Lowering the height between the outer cowling of the nacelle and the engine casing formed by the assembly of the VCI with the casing of the fan, i.e., decreasing the radial thickness of the fan compartment, necessitates displacing the bulky items of equipment from this compartment towards other positions on the turbine engine.

Studies have shown that there is a strong interest in placing the lubricant tank in the engine compartment of the gas generator, i.e. the inter-vein compartment (or space) located between the primary and secondary ducts of the double-flow turbine engine, and in particular in an upstream area of this engine compartment referred to as the "booster" compartment, since it is located substantially in line with the low-pressure compressor (booster) of the turbine engine. A first advantage is linked to the fact that the tank is located as close as possible to the lubrication unit of the turbine engine, and therefore limits the length of the oil routing between these elements. Another advantage is that the booster compartment is cooler and less bulky than the rest of the engine compartment. Compared to an area downstream of the engine, in particular an area in the vicinity of the turbines, the ambient temperature in the booster compartment is more favourable to the use of electronic oil level sensors in the tank. This thermal environment also contributes to a less bulky and less expensive design of the tank and its supporting parts, compared to the rest of the inter-duct space (also referred to as core area) in a double-flow turbine engine.

The problem with the environment of this installation in the engine compartment is that the lubricant tank must be supplied from outside, "under the wing", by a maintenance technician.

In the case of a tank referred to as "classic", i.e. equipped with a filling orifice located on itself, the filling operation is complex because the tank located in the engine compartment is difficult to access. Indeed, due to its position inside the turbine engine, the tank and its filling orifice are located inside several coaxial layers, such as a fan cover, thrust reverser covers (potentially stationary on the UHBR architectures), an outer shroud of the intermediate casing (also referred to as VCI), and cowlings of the engine kit, portion the most central of the environment.

Since the filling operation must be performed out in a very short time, and the opening of the fan covers and thrust reversers are not designed for this type of operation, the access to the filling orifice in such a case is problematic. The number of "layers" and the large diameter of a UHBR make it difficult to reach the tank from the outside. In addition, the filling operation must be able to be performed blindly, i.e. the operator may have to pour a predetermined amount of oil without necessarily having access to an indication of the fill level.

In the document FR-A1-3 072 425, the Applicant has proposed a solution that allows the tank located inside the turbine engine to be filled without opening the covers constituting the nacelle. The prior art further comprises the documents FR-A1-3 082 552 and FR-A1-3 079 873.

The present disclosure proposes a simple, effective and economical alternative to solve the aforementioned problem.

SUMMARY

The disclosure proposes a double-flow turbine engine, comprising:
  a gas generator,
  a nacelle that surrounds the gas generator,
  arms for connecting the gas generator to the nacelle,
  an annular duct for the flow of a primary flow, the duct being formed in the gas generator and being externally delimited by a first annular casing of the gas generator,
  an annular duct for the flow of a secondary flow, the duct being formed between the gas generator and the nacelle and being delimited internally by a second annular casing of the gas generator and externally by a third annular casing surrounded by the nacelle, the second and third casings being connected together by at least some of the arms,
  at least one lubricant tank located in an annular space extending between the first and second casings,
  at least one hatch provided on an outer cowling of the nacelle, for filling the tank,
  characterized in that the tank is configured to be filled by means of a removable tubular pipe inserted from the hatch to the tank, the third casing comprising a first interface configured to be passed through by the pipe, and the second casing comprising a second interface for connecting the pipe to the tank.

The disclosure thus proposes a simple solution for filling a lubricant tank located in the engine compartment. This filling is done by means of a pipe. A filling pipe has an elongated shape and is tubular. It has a proximal end equipped with, for example, a funnel into which lubricant, contained for example in a can, is poured. It also has a distal end that is intended to be connected to the tank for gravity flow of lubricant through the pipe and into the tank. The pipe goes through several layers as mentioned above. On the one hand, it passes through a hatch of the nacelle, which can be of small dimensions given the relatively small cross-section of the pipe. The pipe then passes through a first interface of the third casing to pass through the secondary duct, i.e. the duct of the secondary flow of the double-flow turbine engine. This third casing can be a shroud of the intermediate casing. The pipe then reaches the second interface for the fluidic connection of the pipe to the tank. The second interface is located on the second casing which can be a panel of the engine kit of the turbine engine. The pipe is removable and is taken out after each filling.

One of the advantages of the disclosure is that the duct for the flow of the secondary flow is not impacted after filling the tank and removing the pipe. The first interface allows to guide the pipe during insertion and the second interface ensures the fluidic connection to the tank without risk of leakage into the duct.

The turbine engine according to the disclosure may comprise one or more of the following characteristics, taken in isolation from each other, or in combination with each other:
- the first and second interfaces are located directly in the duct for the flow of the secondary flow;
- the first interface comprises a telescopic guiding system comprising a plurality of elements mounted coaxially and slidably one inside the other, this system being adapted to be passed through by the pipe and to adopt a first retracted position in which it has a minimum length or thickness and does not project into the duct for the flow of the secondary flow, and a second extended position in which it has a maximum length or thickness and projects into the duct for the flow of the secondary flow towards the second interface;
- the second interface comprises a connecting device comprising:
  an end-piece configured to cooperate by male-female nesting with a complementary end-piece on a distal end of the pipe, and
  a mechanism for opening the tank when the nesting is effective;
- the opening mechanism comprises at least one portion movable from a closed position to an open position of the tank, the movable portion being biased by an elastic member in its closed position and being brought to its open position by the male-female nesting;
- the second interface comprises a guiding and locking element configured to cooperate by bayonet effect with an element complementary of the end-piece on the pipe;
- the hatch is located upstream of the thrust reverser covers of the turbine engine;
- the tank has a generally curved shape and extends partly around a longitudinal axis of the turbine engine;
- the or each tank is located substantially in line with a low-pressure compressor of the gas generator.

The present disclosure also relates to an assembly comprising a turbine engine as described above and a removable tubular pipe for filling the tank, this pipe being configured to pass through the first interface and to be connected to the tank via the second interface.

Advantageously, the pipe comprises a distal end equipped with an end-piece configured to cooperate by male-female nesting with a complementary end-piece of the second interface, this end-piece being equipped with a shutter device arranged to open the distal end of the pipe when this nesting is effective and to close the distal end when the end-piece and the complementary end-piece are disengaged from each other.

The pipe preferably comprises at least one member movable between a retracted position along the pipe and an extended position projecting from the pipe, this movable member being adapted to cooperate with the system in order to force it to retract when the pipe is removed from the turbine engine.

In one embodiment, the first interface is formed by an opening provided in the third casing, the hatch comprises a movable member for closing the hatch equipped with a shutter arranged to close the opening when the hatch is closed, and the pipe is associated with a guiding system arranged to be installed at the location of the hatch once the latter is open and to be uninstalled once the tank is filled.

The present disclosure also relates to a method for filling a lubricant tank in an aircraft turbine engine, by means of an assembly as described above, wherein it comprises the steps of:
- opening the hatch of the nacelle,
- inserting the pipe through the hatch and then through the first interface,
- passing the pipe through the duct for the flow of the secondary flow to the second interface for connecting the pipe to the tank, and
- flowing lubricant from a proximal end of the pipe located outside the turbine engine to a distal end of the pipe and to the tank.

DESCRIPTION OF THE DRAWINGS

The disclosure will be better understood and further details, characteristics and advantages of the disclosure will become apparent from the following description made by way of non-limiting example and with reference to the attached drawings in which:

FIG. 12 is a similar view to FIG. 5 and illustrates an alternative embodiment of the filling pipe, FIGS. 13 to 15 are views similar to that of FIG. 12 and showing steps of removing the pipe, after filling the tank, and of storing the first interface.

DETAILED DESCRIPTION

Figure 1:
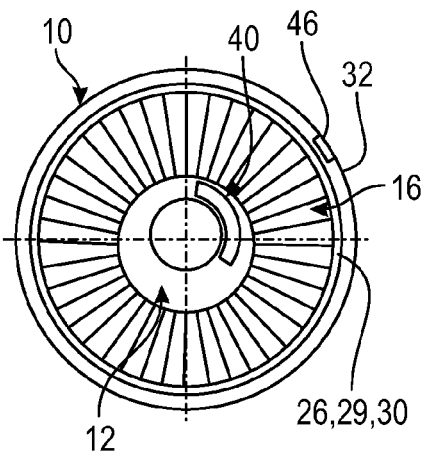
FIG. 1 is a very schematic front view of a turbine engine.
Figure 2:
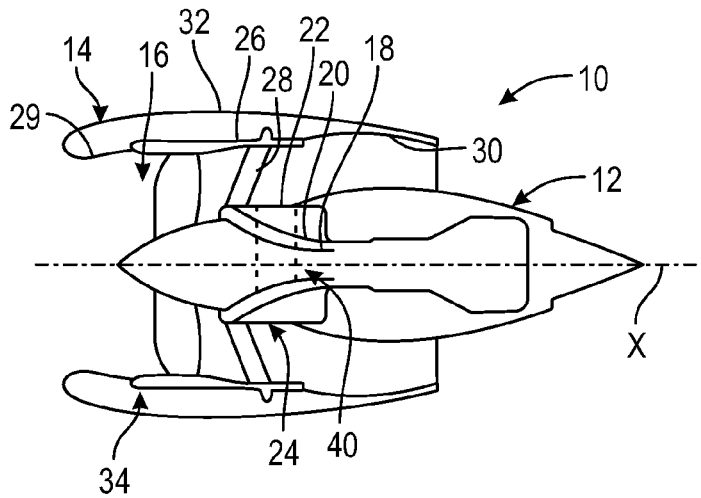
FIG. 2 is a very schematic axial cross-section view of a turbine engine.

FIGS. 1 and 2 show schematically an aircraft turbine engine 10 of the double-flow type. The turbine engine 10 comprises essentially two portions, namely a gas generator 12 that has a generally elongated shape along a longitudinal axis X, and a nacelle 14 that surrounds the gas generator 12.

The gas generator 12 is not shown in detail. Classically, it comprises two rotating bodies, namely a low-pressure (LP) body and a high-pressure (HP) body. Each body comprises a compressor rotor and a turbine rotor. The gas generator comprises, from upstream to downstream, in the flow direction of the gases, a LP compressor, an HP compressor, a combustion chamber, an HP turbine and a LP turbine. The rotors of the HP compressor and of the HP turbine are connected to each other by an HP shaft to form the HP body, the rotors of the HP compressor and the HP turbine being located respectively upstream and downstream of the combustion chamber. The rotors of the LP compressor and the LP turbine are connected to each other by a LP shaft to form the LP body, the rotors of the LP compressor and the LP turbine being located respectively upstream of the HP compressor and downstream of the HP turbine. The LP shaft further drives, either directly or by means of a reducer, a fan rotor 16 which is located on the upstream side of the gas generator.

The gas generator 12 comprises a duct for the flow of a primary flow or hot flow, which passes through the compressors, the combustion chamber, and the turbines. This duct referred to as primary duct is generally delimited internally and externally by annular casings 18, 20, between which in particular vanes of the compressors and turbines extend. The annular casing 20 which externally delimits this duct is itself surrounded at a distance by an annular casing 22 which internally delimits the secondary duct of the double-flow turbine engine 10. This annular casing 22 may consist of covers and/or panels. The casings 20 and 22 are radially spaced from each other and define an annular space 24 between them referred to as inter-duct space or engine compartment. The casings 20, 22 may form an assembly at the level of the LP and HP compressors commonly referred to as an intermediate casing hub.

The gas generator 12 is surrounded by an annular fan casing 26, which extends around the fan rotor 16 and is rigidly connected to the gas generator at the level of the casing 22, by an annular row of substantially radial tubular arms 28. These arms can be those commonly referred to as OGV grid (acronym of Outlet Guide Vane).

In FIG. 2, for simplicity, the annular casing 26 has been designated as also including the VCI, i.e., the outer intermediate casing shroud. As used herein, the casing 26 also refers to the combination of the fan casing with the VCI.

The assembly comprising the gas generator 12, the fan rotor 16, the casing 26 and the arms 28, forms the engine portion of the turbine engine. The casing 26 supports the nacelle which comprises annular covers 29, 30 extending upstream and downstream of the casing 26 as an extension of the latter, as well as an external annular cowling 32 which extends around the casings 26, 29, 30. The cowling 32 extends at a radial distance from the casings 26, 29, 30 and delimits with them an annular space referred to as nacelle compartment 34.

In the present technique, a tank for lubricant, and in particular oil, for example for lubricating bearings of the turbine engine 10, is mounted in the nacelle compartment 34. The tank is therefore accessible inside the nacelle compartment, by dismounting a panel of the cowling 32 for example, in order to fill it and also to know its oil level.

The disclosure proposes to position the lubricant tank 40 within the engine compartment 24, as schematically shown in FIGS. 1 and 2. In the example shown, it is located between the casings 20, 22, substantially in line with a compressor, for example LP, and/or in line with the arms 28. In the particular embodiment shown (see FIG. 2), it is located in a transverse plane passing substantially through the radially external ends of the arms 28, which extend from upstream to downstream radially outward. The tank 40 has a generally curved shape (see FIG. 1), thus generally matching the shape of the engine compartment 24 available in this plane.

Figure 3:
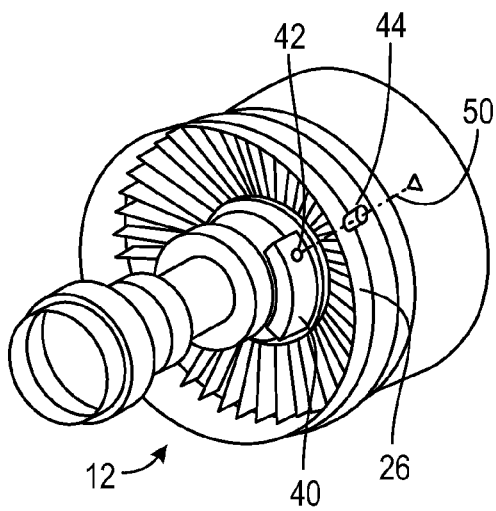
FIG. 3 is a schematic perspective view of a propulsion assembly.
Figure 4:
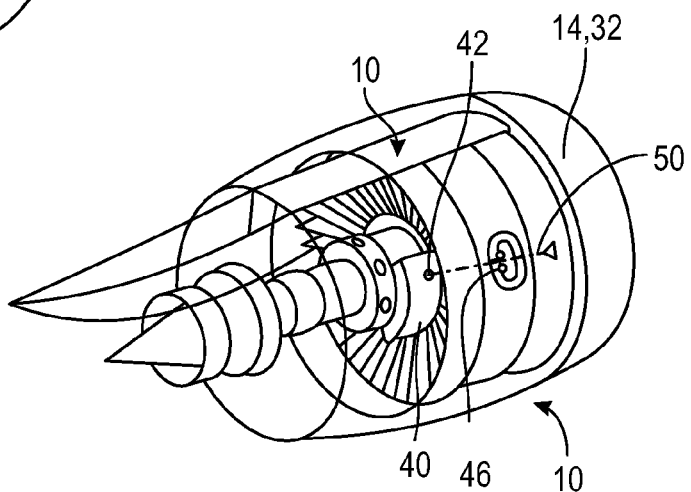
FIG. 4 is a partial schematic perspective view of a turbine engine comprising the propulsion assembly shown in FIG. 3.

FIGS. 3 and 4 show characteristics of the disclosure. The tank 40 is filled by means of a removable tubular pipe 50 that is inserted through a hatch 46 and a first interface 44, until it reaches a second interface 42 for fluidic connection to the tank 40.

The hatch 46 is located on an external cowling 32 of the nacelle 14, preferably just upstream of thrust reverser covers. This hatch 46 comprises, for example, a flap 46a hingedly mounted on a panel of the cowling 32, and movable between a position for closing an opening of the hatch and a position for free access to this opening.

The flap 46a of the hatch 46 can be equipped with a spring type connection for returning the flap to its closed position. It can be opened, for example, by simply pressing the pipe 50, and closed again when the pipe is removed.

The interface 42 is located on the casing 22 and communicates directly with the fill orifice of the tank 40.

The interface 44 is located on the casing 26.

The pipe 50 has an elongated shape and is tubular and comprises a proximal end equipped with, for example, a funnel into which lubricant is poured, contained for example in a can. It also has a distal end that is intended to be connected to the tank 40 for gravity flow of lubricant through the pipe and into the tank.

The pipe 50 is thus inserted and positioned in the turbine engine 10 so that oil can flow by gravity from its proximal end to its distal end and the tank 40.

The angle of the pipe 50 during filling, with respect to the longitudinal axis X of the turbine engine, depends on the one hand on the slope necessary for the flow of oil during filling (for example of the order of approximately) 4°, and on the roll angle of the aircraft equipped with the turbine engine, which is for example of the order of approximately 6°. The overall angle between the pipe 50 and the axis X is, for example, 10° in this example. Because of this relatively large angle, the pipe cannot pass through one of the arms 28 because it would have to be oversized.

The solution is therefore to pass the pipe 50 through interfaces 42, 44 located or opening directly into the duct for the flow of the secondary flow.

Figure 5:
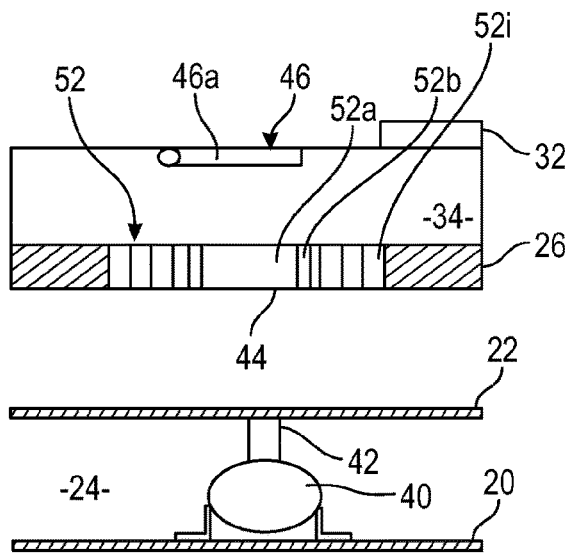
FIG. 5 is a very schematic cross-sectional view of the different layers that a filler pipe must pass through to reach a lubricant tank located in the engine compartment of a turbine engine.

FIG. 5 is a cross-sectional view of the cover 32 and casings 22, 26, and interfaces 42, 44.

In the illustrated example, the interface 44 is intended to be passed through by the pipe 50 and comprises a telescopic guiding system 52 comprising a plurality of elements 52a, 52b, . . . , 52i mounted coaxially and slidably within one another. The element 52a is the smallest element that is located at the centre of the system 52, and the element 52i is the largest element that is located at the periphery of the system 52.

Alternatively, the system 52 could be integrated into the hatch 46.

The system 52 is adapted to adopt a first retracted position, shown in FIG. 5, in which it has a minimum length or thickness, measured in a radial direction with respect to the axis X, and does not protrude into the duct for the flow of the secondary flow. This thickness can be similar to that of the casing 26. In the event that the thickness of the system is greater than that of the casing 26, the radially internal end of the system would be aligned with the internal surface of the casing 26 and the radially external end of the system would be located in the nacelle compartment.

Figure 6:
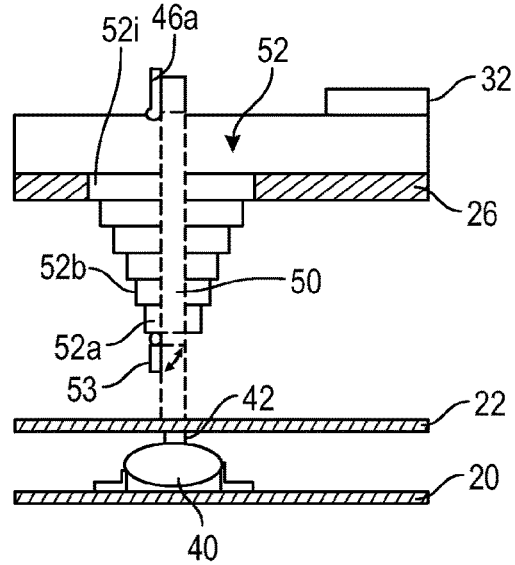
FIG. 6 is a view similar to FIG. 5 and shows a step in a method for filling the tank, consisting in inserting the pipe through a hatch and then a first interface.
Figure 7:
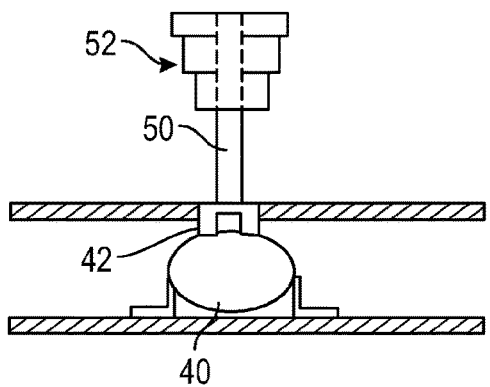
FIG. 7 is a view similar to FIG. 5 and shows another step in a method for filling the tank, consisting in connecting the pipe to a second interface and to the tank.

The system 52 is adapted to adopt a second extended position, visible in FIG. 6, in which it has a maximum length or thickness and projects into the duct for the flow of the secondary flow towards the other interface 42. The number of elements 52a, 52b, . . . , 52i of the system 52 is for example between 3 and 10.

Figure 8:
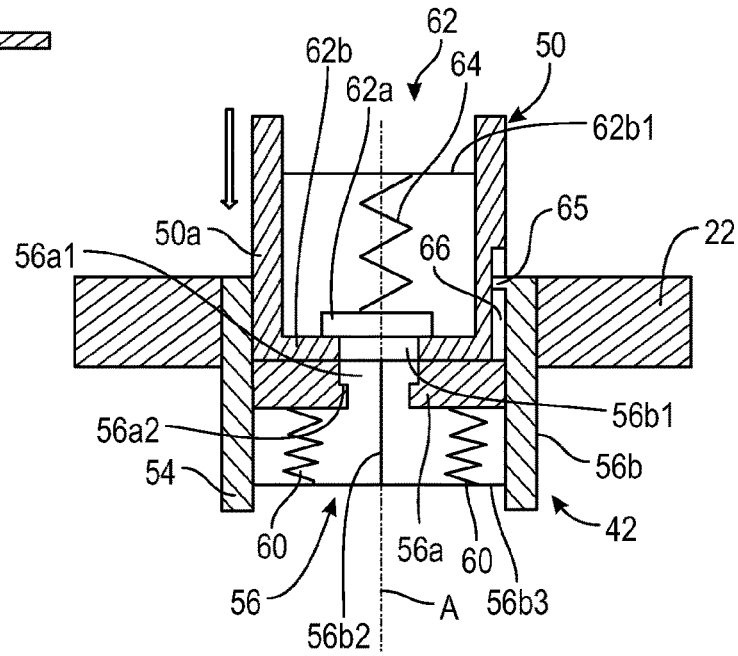
FIG. 8 is a very schematic larger scale view of the connection between the pipe and the tank.

The interface 42, best seen in FIG. 8, comprises a connection device comprising:
an end-piece 54 configured to cooperate by male-female nesting with a complementary end-piece 50a of a distal end of the pipe 50, and
a mechanism for opening 56 the tank 40 when the nesting is effective.

It is understood that the interface 42 at the level of the casing 22 and the filling orifice of the tank 40 are commonized, which is advantageous for facilitating the guiding of the pipe 50 and limiting the mass and the overall dimension of this interface.

Figure 16:
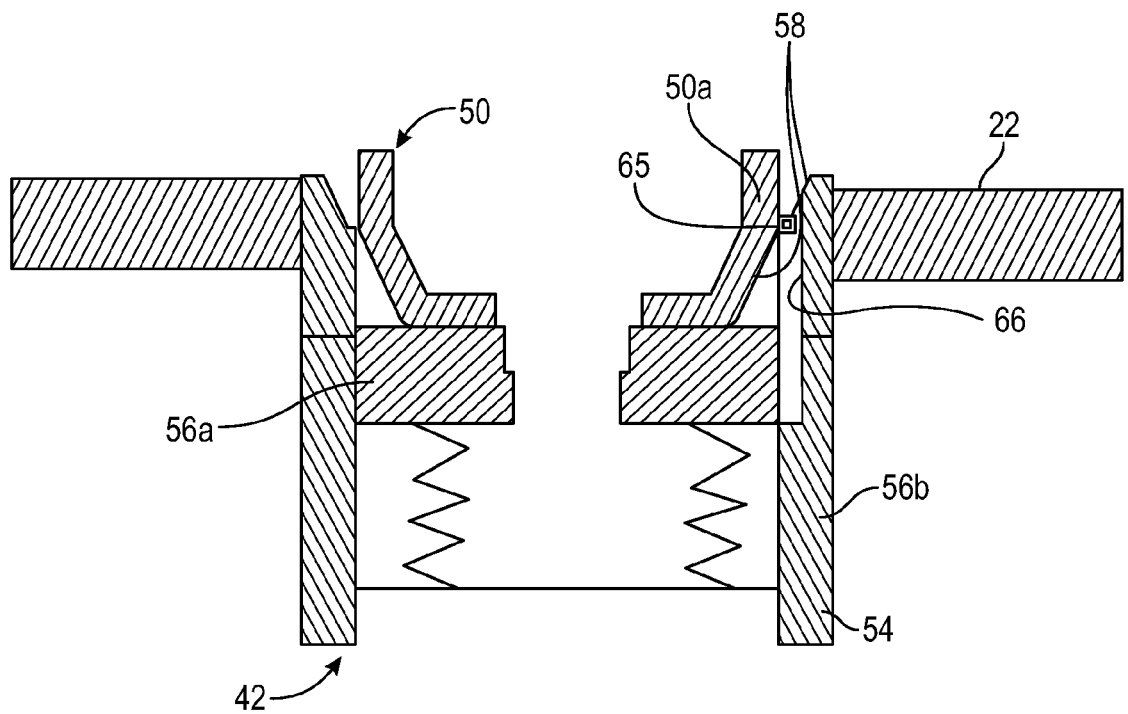
FIG. 16 is a view similar to FIG. 8 and shows a variant embodiment of the fluidic connection between the pipe and the second interface.

In the example shown, the pipe 50 comprises a male end-piece 50a that is engaged with a female end-piece 54 of the interface 42. These end-pieces may be generally cylindrical in shape or may comprise free ends comprising complementary frustoconical surfaces 58, as seen in FIG. 16, to facilitate the centering and the guiding the end-pieces into each other. For the sake of simplicity in FIG. 16, the opening mechanism 56 of the tank 40 and the shutter device 62 of the pipe 50 are not shown in this figure.

Figure 17:
FIG. 17 is a very schematic view of an optimized cross-sectional profile of a recess of a casing

When the pipe 50 is removed, due to the recess in the interface 42, a slight recess may remain in this interface, which generates some disturbance in the flow of the airflow along the casing 22. An optimized shape of this recess is shown in FIG. 17.

With end-pieces, for example, as shown in FIG. 16, a turbine engine configuration in which the first interface 44 would not comprise a telescopic guiding system 52 of the pipe is conceivable, since the end-pieces may be slightly off-center with respect to each other as they approach. The guiding system of the pipe 50 can thus be less precise than that which can be obtained by a telescopic guiding, the centering defect being made up during the nesting thanks to the shape of the two end-pieces which facilitates the centering and the guiding of one in the other.

For example, it is possible to provide a guiding system associating, on the one hand, an orifice for the passage of the pipe 50 in the interface 44 intended to be passed through by the pipe and on the other hand an orifice for the passage of the pipe arranged in the nacelle under the hatch 46.

It is also possible to provide a guiding system that is independent of the interface 44 and uses a device fitted to the nacelle. Such a guiding system can be installed at a location cleared by the opening of the hatch 46 prior to the placement of the pipe 50 for filling and is therefore intended to be removed after the removal of the pipe. An example of such an embodiment is described below with reference to FIGS. 18 to 20.

Figure 9:
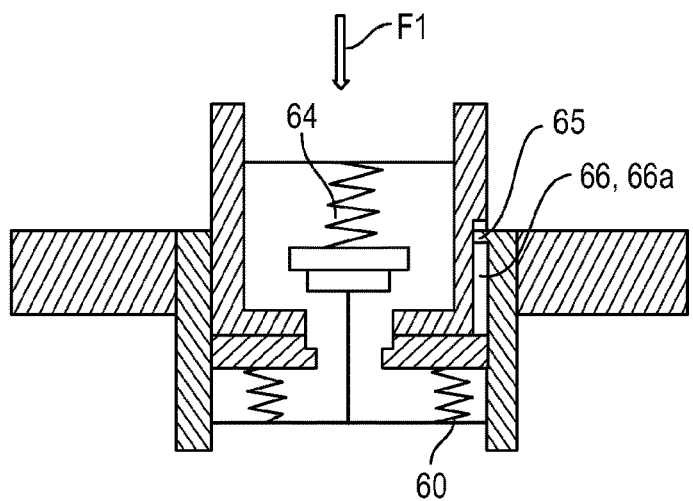
FIGS. 9 to 11 are views similar to the one in FIG. 8 and showing the filling steps of the tank.

The opening mechanism 56 of the tank 40 comprises at least one portion 56a movable from a closed position visible in FIG. 8 to an open position of the tank 40 visible in FIG. 9. The movable portion 56a is biased by an elastic member 60, such as one or more springs, into its closed position and is brought to its open position by the nesting of the end-pieces.

As in the example shown, the distal end of the pipe 50 may also comprise a shutter device 62 in the form of an opening mechanism similar to the opening mechanism 56 of the tank. This shutter device 62 and the mechanism 56 are advantageously intended to be operated simultaneously.

In this case, the opening mechanism 56 comprises a stationary portion 56b with respect to which the portion 56a is movable. The stationary portion 56b cooperates by bearing, during the male-female nesting, with a movable portion 62a of the shutter device 62 of the pipe 50 to displace it from a closed position represented in FIG. 8 to an open position represented in FIG. 9. This closed position is a rest position because an elastic member 64, such as one or more springs, biases the movable portion 62a of the pipe into this position. The member 64 extends between the movable portion 62a and a stationary support 62b1 of the pipe 50. During the male-female nesting, a stationary portion 62b of the shutter device 62 of the pipe 50, rests on the movable portion 56a of the opening mechanism 56 and pushes it to its open position.

From FIG. 8, it can be seen that the stationary portion 56b of the opening mechanism 56 comprises a shutter 56b1 of a central orifice 56a1 of the movable portion 56a. This shutter 56b1 is rigidly connected by a rod 56b2 to a stationary support 56b3 of the portion 56b.

One or more elastic members 60 extend between the support 56b3 and the movable portion 56a to bias it into a rest position in which the shutter 56b1 rests on a shoulder 56a2 of the orifice 56a1 which forms a seat for the shutter to rest on and thus ensures a tight closure of the interface 42. Preferably, the interface 42 comprises a guiding and locking element 64 configured to cooperate with bayonet effect with a complementary element 66 of the end-piece 50a of the pipe 50.

In the example shown in FIGS. 5 to 15, the end-piece 54 of the interface 42 comprises a lug 65 for engaging and sliding cooperation with an L-shaped groove or slit 66 in the end-piece 50a of the pipe 50. The nesting of the end-pieces is realized along an axis A and the lug 65 extends radially inward, i.e., toward the axis A from the end-piece 54. Thus, it is understood that the slit 66 is located at the external periphery of the end-piece 50a. This slit 66 comprises a longitudinal segment 66a opening onto the free end of the end-piece 50a and a lateral segment 66b which is oriented circumferentially with respect to the axis A.

When the end-pieces 50a, 54 are nested together, the lug 65 is engaged and slides in the longitudinal segment 66a of the slit until it reaches the lateral segment of this slit (arrow F1-FIG. 9). The pressure along the axis A exerted by the pipe 50 on the interface 42 allows to open the mechanisms 56, 62. The length of the segment 66a can be sized so that the mechanisms open only at the end of the stroke of the lug 65 in this segment 66a. In this position, the two mechanisms are thus open, as shown in FIG. 9, and a rotation of the pipe 50 and thus of its end-piece 50a, in the end-piece 54 of the interface 42, leads to the sliding of the lug 65 in the lateral segment 66b of the slit 66 (arrow F2-FIG. 10). The end-pieces are then locked in the nested position with the mechanisms 56, 62 open, and oil can be poured through the pipe 50 to the tank 40 for refilling. The elastic members 60, 64 remain compressed by mechanical locking.

Figure 10:
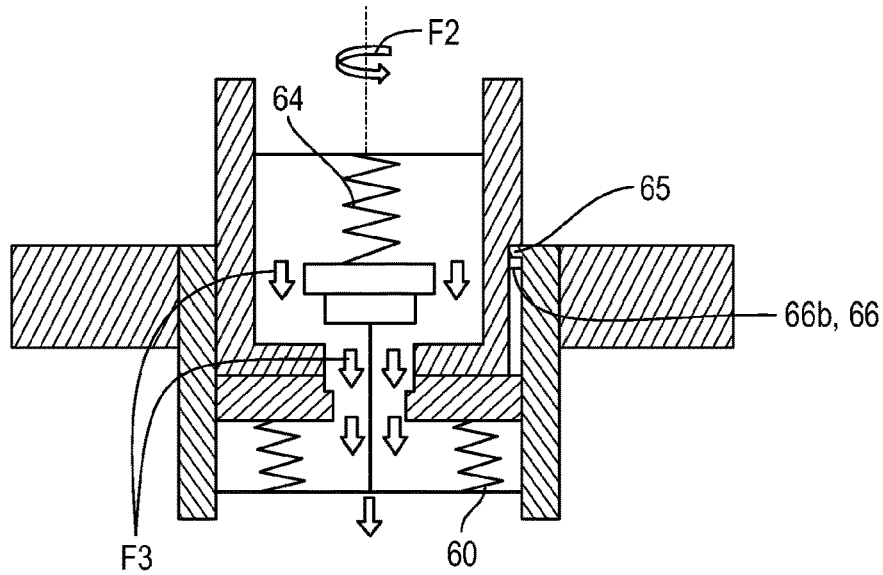
Figure 11:
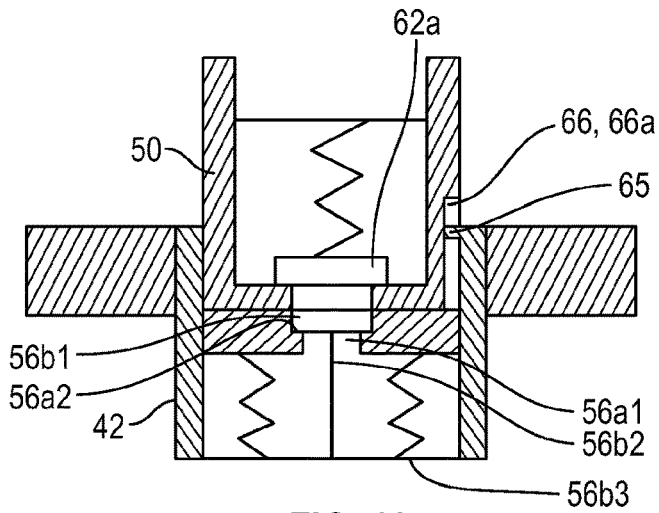

Oil can then flow through the pipe 50 to the tank 40 (arrows F3-FIG. 10). After filling the tank 40, the end-pieces are disengaged from each other by repeating the aforementioned displacements in reverse order. The pipe 50 and its end-piece 50a are displaced in rotation about the axis A so that the lug 65 slides into the lateral segment 66b and reaches the longitudinal segment 66a of the slit 66. The connection is then unlocked and the elastic members 60, 64 ensure the return to the rest position of the movable portions of the mechanisms. The pipe 50 is then removed by axial translation and sliding of the lug 65 in the longitudinal segment 66a of the slit so that the shutter 56b1 rests on the shoulder 56a2 of the movable portion 56a (FIG. 11). If residual oil leaks into the pipe, it is retained by the tight seal of the mechanism of the end-piece of the pipe.

In the embodiment shown in FIG. 16, the lug 65 is carried by the end-piece 50a of the pipe 50, and the slit 66 is then formed on the end-piece of the interface 42.

The present disclosure thus relates to a method for filling a lubricant tank 40 in an aircraft turbine engine, comprising several steps including:
- a step of opening the hatch 46 of the nacelle 14;
- a step of inserting the pipe 50 through the hatch 46 and then through the second interface 42, as shown in FIG. 6; the pipe is then guided by the system of the second interface 42, which telescopes along the pipe 50 and as close as possible to the first interface 44; the element 52a can be equipped with a flap 53 which comprises at least one pivoting flap, each equipped with a spring-type connection for return to the closed position, and which would open upon simple pressure of the pipe 50 and close again upon removing the pipe;
- a step of passing the pipe 50 in the duct for the flow of the secondary flow up to the first interface 44 in order to connect the pipe 50 to the tank 40;
- a step of flowing lubricant from the proximal end of the pipe located outside the turbine engine to the distal end of the pipe and to the tank 40.

FIGS. 12 to 15 illustrate subsequent steps for removing the pipe 50, after filling the tank 40.

Advantageously, when the pipe 50 is removed at the level of the interface 44, the system 52 folds automatically, by means of the translation of the pipe.

To this end, the pipe 50 may comprise at least one or more members 68 movable between a retracted position along the pipe (FIG. 12), and an extended position projecting from the pipe (FIGS. 13-15). These movable members are able to cooperate with the system 50 in order to force it to retract when the pipe 50 is removed. For example, the members 68 are fins.

As the pipe 50 moves up through the system, the members come to rest on each of the elements 52a, 52b, . . . , 52i, which folds into the upper element (arrow F4). The displacement of the members 68 is ensured by a control means located at the distal end of the pipe 50.

The interface 44 on the casing 26 then returns to its original state (FIG. 5).

Figure 18:
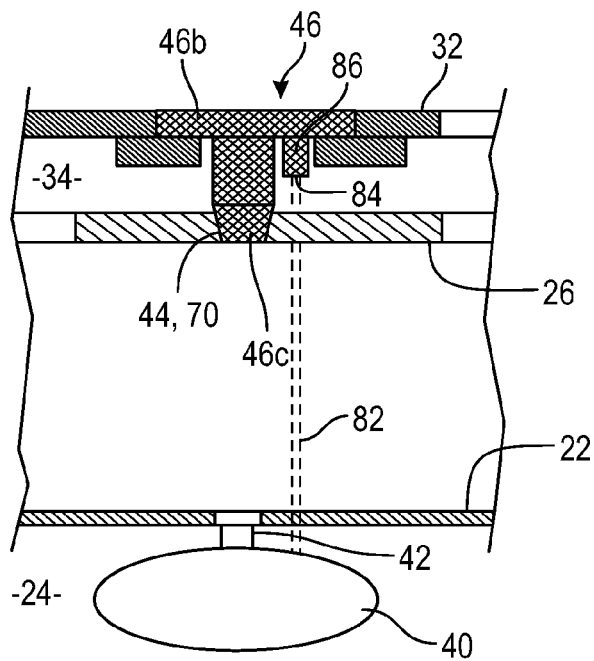
FIG. 18 is a view similar to that of FIG. 5 and showing an alternative embodiment of the disclosure.
Figure 19:
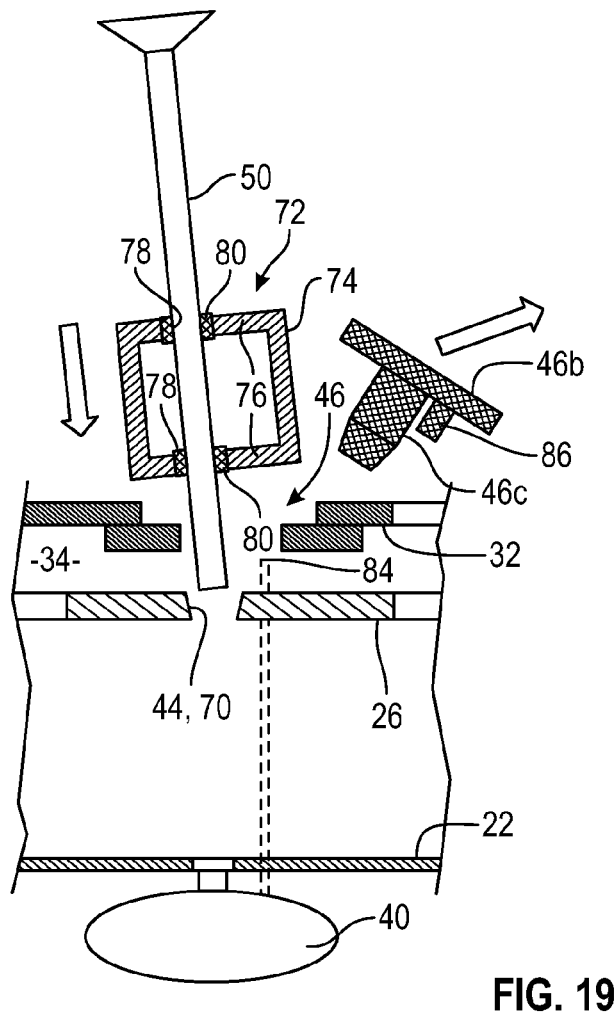
FIG. 19 is another view of the variant of FIG. 18 and shows a step of a method for filling a tank, consisting in inserting the pipe through a hatch and then a first interface.
Figure 20:
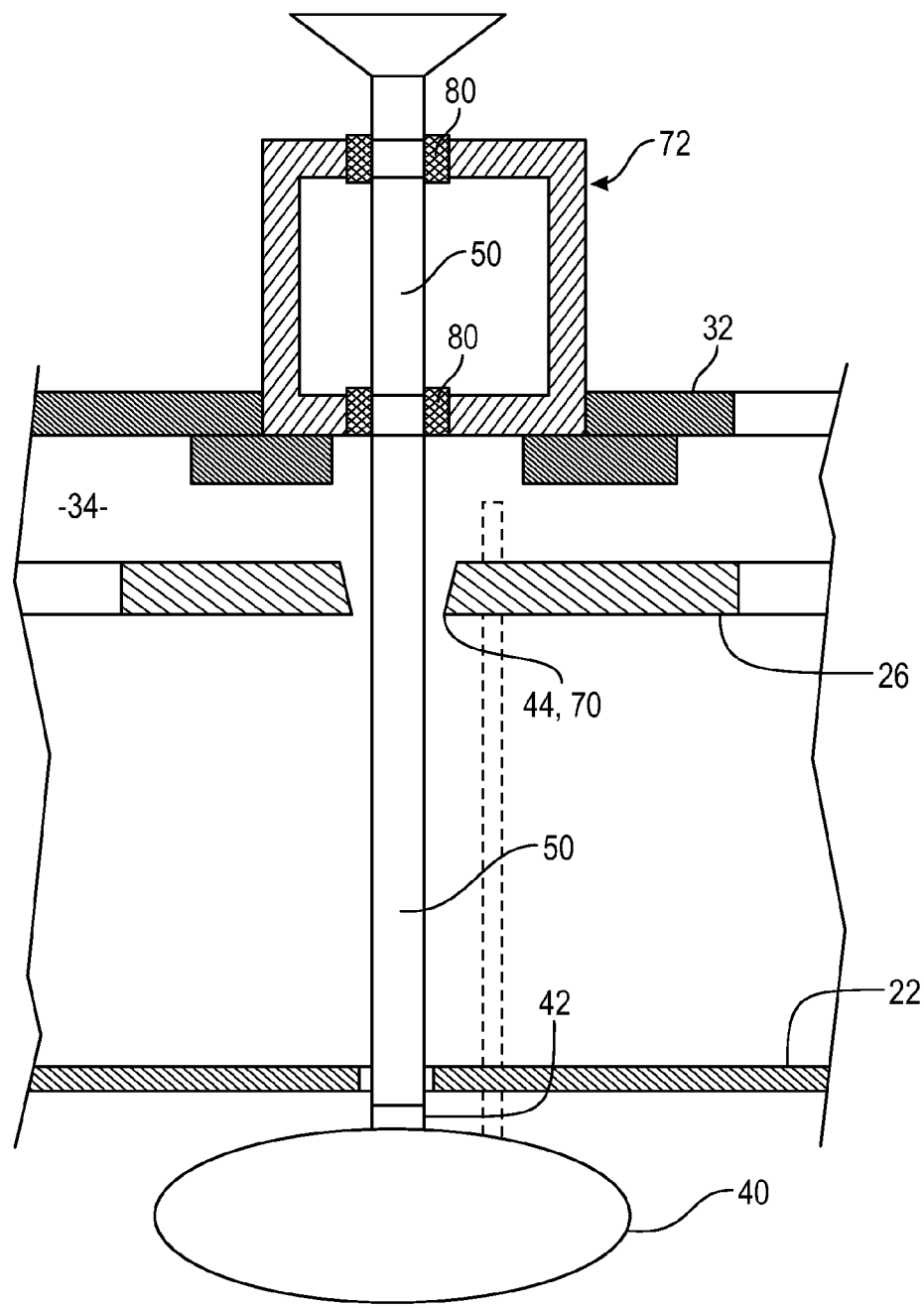
FIG. 20 is a view of the variant of FIG. 18 and shows another step in the method for filling the tank, consisting in connecting the pipe to a second interface and to the tank.

Reference is now made to FIGS. 18 to 20, which illustrate an alternative embodiment of the turbine engine according to the disclosure. The elements of the turbine engine that have already been described in the foregoing are designated by the same references in the following and in FIGS. 18 to 20.

In this alternative embodiment, the first interface 44 is a simple opening 70 provided in the casing 26.

In the illustrated example, the hatch 46 comprises a movable member 46b for closing the hatch equipped with a shutter 46c arranged to close the opening 70 when the hatch is closed. The movable member 46b is in the form of a wall for closing the opening of the hatch 46 and is secured to the shutter 46c which is in the form of an elongated finger extending substantially perpendicularly from an inner surface of the movable member 46b. This finger comprises a free end opposite the movable member 46b, which is configured to be engaged in the opening 70. The free end of the finger thus has a shape complementary to that of the opening 70. The member 46b is movable and in particular removable in that it can be dismounted and removed from the turbine engine, as shown in FIG. 19.

The pipe 50 is similar to that described above and is here associated with a guiding system 72 arranged to be installed at the location of the hatch 46 once the latter is opened, and to be uninstalled once the tank 40 is filled. The system 72 is in the form of a case 74 comprising two parallel walls 76 comprising aligned orifices 78 for the passage of the pipe 50. The case 74 is mounted in the opening of the hatch 46 after removal of the member 46b, and the pipe 50 is then slid through the orifices 78 which may be equipped with anti-friction rings 80 or the like (FIGS. 19 and 20).

FIGS. 18 to 20 illustrate an additional advantageous characteristic that can also be equipped to the turbine engine described with reference to the previous figures. This is a pipeline 82 for putting the interior of the tank 40 in fluidic communication with the external environment of the turbine engine, particularly useful for expelling air from the tank to the outside when it is filled. This allows for a continuous flow of oil through the pipe without the need for the air displaced from the tank by the oil fill to flow back out through the pipe, so the fill flow rate is not compromised. This pipeline 82 extends from the tank 40 to the casing 26 and comprises an end 84 that opens into the nacelle compartment 34 at the level of the hatch opening 46 so that this end 84 is vented at least when the hatch 46 is removed (FIG. 19). This pipeline 82 may be small in diameter (e.g., a few millimeters) and may pass through an OGV arm or auxiliaries passage between the casings 22, 26. In the example shown, in particular so that the tank 40 can be pressurized when the turbine engine is in operation, i.e., so that the pressure inside the tank can be higher than the pressure of the environment outside the turbine engine, the end 84 of the pipeline 82 is provided to be shuttered when the hatch 46 is closed. For this purpose, it may be provided that the movable member 46b of the hatch 46 carries a plug 86 for sealing the end 84 of the pipeline 82 (FIG. 18).

The invention claimed is:

1. An assembly comprising a dual flow turbine engine and a removable tubular pipe, said dual flow turbine engine comprising:
   a gas generator,
   a nacelle which surrounds the gas generator,
   arms configured to connect the gas generator to the nacelle,
   an annular duct for the flow of a primary flow, the duct being formed in the gas generator and being externally delimited by a first annular casing of the gas generator,
   an annular duct for the flow of a secondary flow, the duct being formed between the gas generator and the nacelle and being delimited internally by a second annular casing of the gas generator and externally by a third annular casing surrounded by the nacelle, the second and third casings being connected together by at least some of said arms,
   at least one lubricant tank located in an annular space extending between the first and second casings, and
   at least one hatch provided on an outer cowling of the nacelle, for filling said at least one lubricant tank,
   wherein said at least one lubricant tank is configured to be filled by means of the removable tubular pipe that is not present during operation of the dual flow turbine engine, said removable tubular pipe being suitable to be inserted from one hatch of the at least one hatch to the at least one lubricant tank, said third casing comprising a first interface configured to be passed through by said removable tubular pipe, and said second casing comprising a second interface configured to connect the removable tubular pipe to said at least one lubricant tank,
   and wherein the removable tubular pipe is configured to fill the at least one lubricant tank, to pass through said first interface, and to be connected to the at least one lubricant tank via said second interface.

2. The assembly according to claim 1, wherein said first and second interfaces are located directly in said duct for the flow of the secondary flow.

3. The assembly according to claim 2, wherein said first interface comprises a telescopic guiding system comprising a plurality of elements mounted coaxially and slidably one inside the other, the telescopic guiding system being configured to be passed through by the removable tubular pipe and to adopt a first retracted position in which the telescopic guiding system has a minimum length or thickness and does not project into the duct for the flow of the secondary flow, and a second extended position in which the telescopic guiding system has a maximum length or thickness and projects into the duct for the flow of the secondary flow towards the second interface.

4. The assembly according claim 1, wherein said second interface comprises a connection device comprising:
   an end-piece configured to cooperate by male-female nesting with a complementary end-piece on a distal end of the removable tubular pipe, and
   a mechanism configured to open the at least one lubricant tank when the nesting is effective.

5. The assembly according to claim 4, wherein said opening mechanism comprises at least one portion movable from a closed position to an open position of the at least one lubricant tank, the movable portion being biased by an elastic member into its closed position and being brought to its open position by said male-female nesting.

6. The assembly according to claim 4, wherein said second interface comprises a guiding and locking element configured to cooperate by bayonet effect with an element complementary to the end-piece on the removable tubular pipe.

7. The assembly according to claim 1, wherein the hatch is located upstream of thrust reverser covers of the turbine engine.

8. The assembly according to claim 1, wherein the removable tubular pipe comprises a distal end equipped with an end-piece configured to cooperate by male-female nesting with a complementary end-piece of the second interface, this end-piece being equipped with a shutter device arranged to open the distal end of the removable tubular pipe when this nesting is effective and to close said distal end when said end-piece and said complementary end-piece are disengaged from each other.

9. The assembly according to claim 3, wherein the removable tubular pipe is configured to fill the at least one lubricant tank, to pass through said first, and to be connected to the at least one lubricant tank via said second interface, wherein the removable tubular pipe comprises at least one member movable between a retracted position along the removable tubular pipe, and an extended position projecting from the removable tubular pipe, this at least one member being configured to cooperate with said telescopic guiding system in order to force the telescopic guiding system to retract when the removable tubular pipe is removed from the turbine engine.

10. The assembly according to claim 1, wherein said first interface is formed by an opening provided in said third casing, said hatch comprises a movable member for closing the hatch equipped with a shutter arranged to close said opening when the hatch is closed, and the removable tubular pipe is associated with a guiding system arranged to be installed at the location of the hatch once the latter is open and to be uninstalled once the at least one lubricant tank is filled.

11. A method for filling a lubricant at least one lubricant tank in an aircraft turbine engine, by means of the assembly according to claim 1, the method comprising the steps of:
   opening the hatch of the nacelle,
   inserting the removable tubular pipe through the hatch and then through the first interface,
   passing the removable tubular pipe through the duct for the flow of the secondary flow to the second interface for connecting the removable tubular pipe to the at least one lubricant tank, and
   flowing lubricant from a proximal end of the removable tubular pipe located outside the turbine engine to a distal end of the removable tubular pipe and to the at least one lubricant tank.

* * * * *